US012231849B2

(12) United States Patent
Daley et al.

(10) Patent No.: US 12,231,849 B2
(45) Date of Patent: Feb. 18, 2025

(54) HEARING ASSISTANCE DEVICES AND METHODS OF GENERATING A RESONANCE WITHIN A HEARING ASSISTANCE DEVICE

(71) Applicant: Bose Corporation, Framingham, MA (US)

(72) Inventors: Michael J. Daley, Shrewsbury, MA (US); Shaun Ente, Brighton, MA (US); Lei Cheng, Wellesley, MA (US)

(73) Assignee: Bose Corporation, Framingham, MA (US)

( * ) Notice: Subject to any disclaimer, the term of this patent is extended or adjusted under 35 U.S.C. 154(b) by 127 days.

(21) Appl. No.: 17/446,896

(22) Filed: Sep. 3, 2021

(65) Prior Publication Data

US 2023/0076171 A1 Mar. 9, 2023

(51) Int. Cl.
*H04R 25/00* (2006.01)

(52) U.S. Cl.
CPC .................................... *H04R 25/48* (2013.01)

(58) Field of Classification Search
CPC ........ H04R 25/00; H04R 25/45; H04R 25/60; H04R 25/48
USPC ................................. 381/312, 317–318, 322
See application file for complete search history.

(56) References Cited

U.S. PATENT DOCUMENTS

2013/0294625 A1 11/2013 Burns
2015/0016653 A1* 1/2015 Lu ........................ H04R 1/2826 381/379
2015/0023515 A1* 1/2015 Reimert ............... H04R 1/1083 381/71.6
2020/0204929 A1 6/2020 Zurbruegg et al.

FOREIGN PATENT DOCUMENTS

EP 0455203 A2 11/1991
EP 3531713 A1 8/2019
WO 91/01075 A1 1/1991

OTHER PUBLICATIONS

The International Search Report and the Written Opinion of the International Searching Authority, PCT Application No. PCT/US2022/075816, Dec. 15, 2022, pp. 1-11.
International Preliminary Report on Patentability, International Patent Application No. PCT/US2022/075816, pp. 1-7, dated Mar. 14, 2024.

* cited by examiner

*Primary Examiner* — George C Monikang
(74) *Attorney, Agent, or Firm* — Bond, Schoeneck & King, PLLC

(57) ABSTRACT

The present disclosure provides hearing assistance devices and methods of generating a resonance within hearing assistance devices that use moving coil drivers, e.g., electro-dynamic coil drivers. As small moving coil drivers are typically inefficient within the voice band of frequencies, e.g., above 1 kHz, the hearing assistance devices described herein utilize the resonance of a mass within the hearing assistance device and a compliance of air within the housing of the hearing assistance device or within portions of the acoustic driver housing to aid in amplification of select frequencies within the voice band of human speech, e.g., between 2.5 kHz and 6 kHz. By using the assistance of the resonance created, the moving coil driver utilized does not need to operate as efficiently within the range of resonance frequencies.

19 Claims, 8 Drawing Sheets

HEARING ASSISTANCE DEVICES AND METHODS OF GENERATING A RESONANCE WITHIN A HEARING ASSISTANCE DEVICE

BACKGROUND

Aspects and implementations of the present disclosure are generally directed to systems, devices, and methods for adding resonance to hearing assistance devices.

As humans age and/or start to suffer from hearing loss, they typically start to lose sensitivity to higher frequencies of sound before they lose sensitivity to lower frequencies. With respect to human speech, for example, those who begin to suffer from hearing loss typically lose the ability to hear frequencies at the higher end of the range of frequencies typically associated with human speech, e.g., above 2.5 kHz. Additionally, traditional hearing aids typically utilize balanced armatures to amplify audio signals as they are more efficient in amplifying higher frequencies of the voice band, e.g., above 1 kHz. Using an inefficient driver to amplify frequencies in that range results in audio clipping and reduced voice intelligibility, and/or requires a significant amount of power to utilize.

SUMMARY OF THE DISCLOSURE

The present disclosure provides hearing assistance devices and methods of generating a resonance within hearing assistance devices that use moving coil drivers, e.g., electro-dynamic coil drivers. As small moving coil drivers are typically inefficient within the voice band of frequencies, e.g., above 1 kHz, the hearing assistance devices described herein utilize the resonance of a mass within the hearing assistance device and a compliance of air within the housing of the hearing assistance device or within portions of the acoustic driver housing to aid in amplification of select frequencies within the voice band of human speech, e.g., between 2.5 kHz and 6 kHz. By using the assistance of the resonance created, the moving coil driver utilized does not need to operate as efficiently within the range of resonance frequencies.

Specifically, this disclosure recognizes that the introduction of resonance in key frequency ranges of the voice band, (e.g., between 2.5 kHz and 6 kHz), will effectively boost the device's sensitivity in that key frequency region. The net effect of adding this resonance will increase the sensitivity and overall efficiency of the hearing assistance device.

For example, acoustic coil drivers can include one or more driver ports located at the rear of the acoustic driver. The present disclosure provides a method and device that includes an acoustic mass within one of those ports, e.g., between a rear volume of the acoustic driver and the acoustic back volume inside the housing of the hearing assistance device. This acoustic mass will block the airflow in the frequency range of interest, resulting in a resonance that boosts sensitivity in the key range of interest, e.g., between 2.5 kHz and 6 kHz, or between 3.5 kHz and 4.5 kHz.

In one example, a hearing assistance device is provided, the hearing assistance device including a housing having a front portion and a rear portion, the front portion arranged to be acoustically coupled to a user's ear canal; an acoustic driver disposed within the housing, the acoustic driver comprising a driver housing and a diaphragm; and an acoustic port provided in the driver housing and configured such that: i) at low frequencies the acoustic port is acoustically open; and ii) at high frequencies the acoustic port is acoustically sealed such that a compliance of air within the driver housing resonates with a mass of the diaphragm at the high frequencies.

In an aspect, the acoustic driver is an electrodynamic driver.

In an aspect, the acoustic driver includes a front side configured to face the front portion of the housing and a rear side configured to face the rear portion of the housing, wherein the acoustic port is disposed on and through the rear side of the acoustic driver.

In an aspect, the acoustic port includes an elongated portion configured to protrude from the rear side of the acoustic driver toward the rear portion of the housing and wherein an acoustic mass is formed within the elongated portion.

In an aspect, low frequencies include frequencies less than or equal to 1 kHz.

In an aspect, high frequencies includes frequencies greater than 1 kHz and less than or equal to 8 kHz.

In an aspect, high frequencies are frequencies within a voice band of human speech greater than or equal to 2.5 kHz and less than or equal to 6 kHz.

In an aspect, the hearing assistance device further includes a feedback microphone electrically coupled to at least the acoustic driver such that the hearing assistance device provides active noise cancellation or active noise reduction.

In another example, a hearing assistance device is provided, the hearing assistance device including: an acoustic driver; and a housing supporting the acoustic driver such that the housing and the acoustic driver together define a first acoustic volume and a second acoustic volume, the acoustic driver being arranged such that a first radiating surface of the acoustic driver radiates acoustic energy into the first acoustic volume of the housing and such that a second radiating surface of the driver radiates acoustic energy into the second acoustic volume, wherein the housing defines a nozzle, and wherein the first acoustic volume is acoustically coupled to an acoustic passage in the nozzle such that the acoustic driver is acoustically coupled to a user's ear canal when the hearing assistance device is worn, and wherein the housing is configured such that air in the acoustic passage resonates with air in the first acoustic volume in a high frequency range, thereby increasing acoustic output into the user's ear canal in the high frequency range.

In an aspect, the acoustic driver is an electrodynamic driver.

In an aspect, the high frequency range includes frequencies greater than or equal to 1 kHz.

In an aspect, the high frequency range includes frequencies greater than or equal to 2.5 kHz and less than or equal to 8 kHz.

In an aspect, the high frequency range includes frequencies within a voice band of human speech greater than or equal to 2.5 kHz and less than or equal to 6 kHz.

In an aspect, the first acoustic volume comprises a volume of air having a compliance and wherein the acoustic passage of the nozzle comprises an acoustic mass such that the acoustic mass of the acoustic passage and the compliance of the volume of air within the first acoustic volume resonate at frequencies within the high frequency range.

In another example, a method of generating a resonance within a hearing assistance device, the method including: forming an acoustic port on or in a driver housing of an acoustic driver, the acoustic driver disposed within the hearing assistance device and comprising a diaphragm; and driving the acoustic driver such that: i) at low frequencies the acoustic port is acoustically open; and ii) at high frequencies the acoustic port is acoustically sealed such that a compliance of a volume of air within the driver housing resonates with a mass of the diaphragm at the high frequencies.

In an aspect, the acoustic driver is an electrodynamic driver.

In an aspect, the acoustic driver is formed with a front side configured to face a first cavity of the housing and a rear side configured to face a second cavity of the housing, wherein the acoustic port is disposed on and through the rear side of the acoustic driver.

In an aspect, the acoustic port is formed with an elongated portion configured to protrude from the rear side of the acoustic driver toward the second cavity of the housing and wherein an acoustic mass is formed within the elongated portion.

In an aspect, high frequencies includes frequencies greater than 1 kHz and less than or equal to 8 kHz.

In an aspect, high frequencies are frequencies within a voice band of human speech greater than or equal to 2.5 kHz and less than or equal to 6 kHz.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides hearing assistance devices and methods of generating a resonance within hearing assistance devices that use moving coil drivers, e.g., electro-dynamic coil drivers. As small moving coil drivers are typically inefficient within the voice band of frequencies, e.g., above 1 kHz, the hearing assistance devices described herein utilize the resonance of a mass within the hearing assistance device and a compliance of air within the housing of the hearing assistance device or within portions of the acoustic driver housing to aid in amplification of select frequencies within the voice band of human speech, e.g., between 2.5 kHz and 6 kHz. By using the assistance of the resonance created, the moving coil driver utilized does not need to operate as efficiently within the range of resonance frequencies.

The term "hearing assistance device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. A hearing assistance device includes an acoustic driver to transduce audio signals to acoustic energy. The acoustic driver can be housed in an earcup, earbud, or other portion of the hearing assistance device that sits within the user's ear canal during operation. While some of the figures and descriptions following can show a single hearing assistance device, a pair of hearing assistance devices can be provided, each having a respective portion that sits within the user's ear canal. Additionally, each hearing assistance device can be connected mechanically to another hearing assistance device or headphone, for example by a headband and/or by leads that conduct audio signals to an acoustic driver in the hearing assistance device or headphone. Furthermore, as will be described below, hearing assistance devices can include components for wirelessly receiving audio signals. A hearing assistance device can also include components of an active noise reduction (ANR) system. Hearing assistance devices can also include other functionality such as a microphone so that they can function as a headset. While FIG. 1 shows and example of a behind-the-ear form factor, in other examples the hearing assistance device can be an on-ear, around-ear, in-ear, or near-ear headset.

Figure 1:
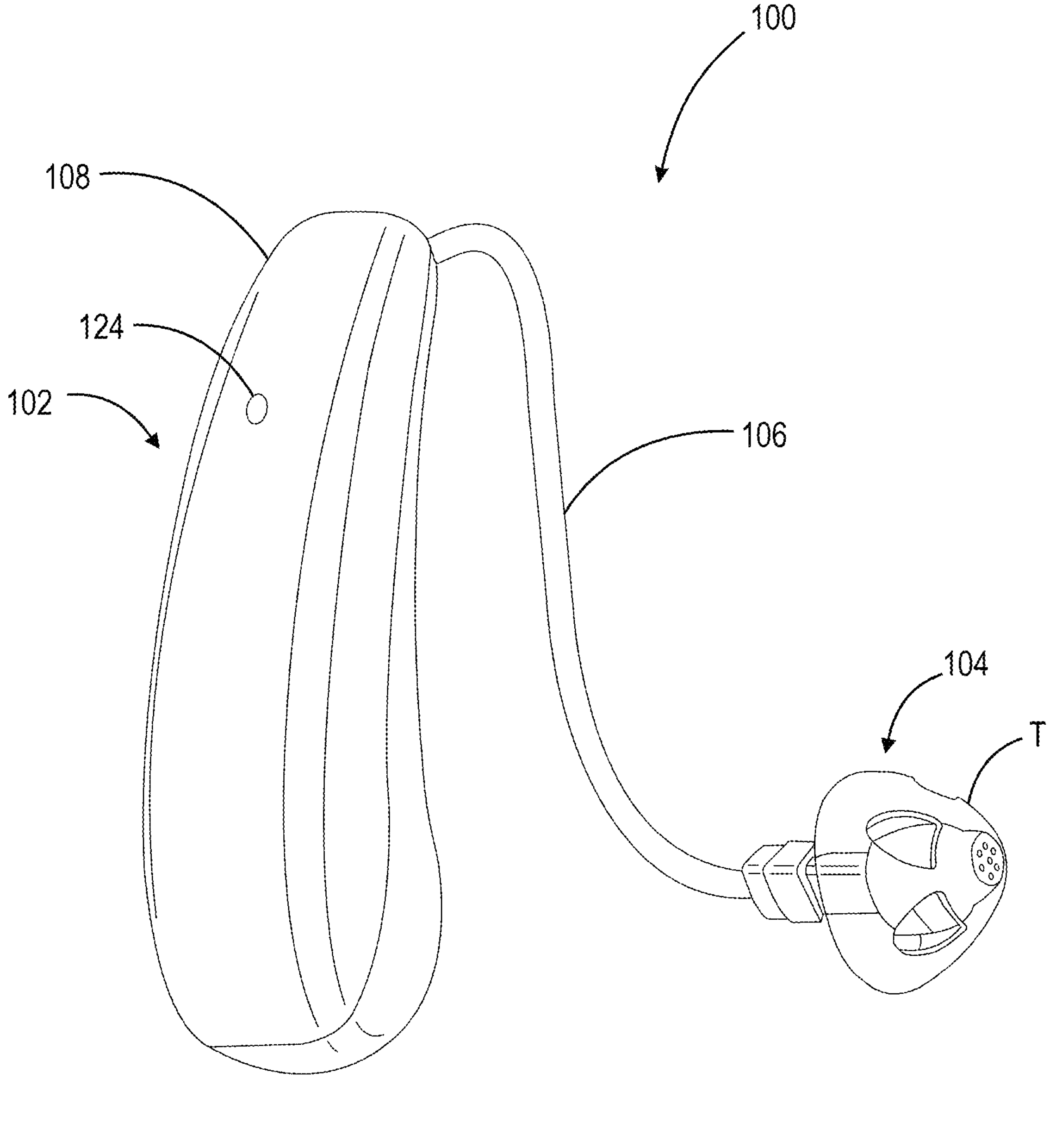
FIG. 1 is a perspective view of a hearing assistance device according to the present disclosure.

The following description should be read in view of FIGS. 1-6. FIG. 1 is a front perspective view of a hearing assistance device 100 according to the present disclosure. Hearing assistance device 100 includes a behind-the-ear portion 102 and a receiver-in-canal portion 104. During operation of hearing assistance device 100, behind-the-ear portion 102 (hereinafter referred to as "BTE portion 102") is configured to secure to or mount behind a user's ear, while the receiver-in-canal portion 104 (hereinafter "RIC portion 104") is configured to sit within a user's ear canal. BTE portion 102 is communicably coupled or in electrical communication with RIC portion 104 via one or more wires 106. As will be discussed below, audio signals and/or electrical signals processed or utilized by BTE portion 102 or RIC portion 104 are transported via the one or more wires 106 in the generation of audible acoustic energy proximate the user's ear canal. As illustrated, RIC portion 104 includes a deformable tip T configured to engage with at least a portion of the user's ear or ear canal. Although illustrated as an open deformable tip, e.g., a deformable tip with one or more holes, it should be appreciated that tip T can be a closed tip, e.g., where tip T includes no holes and the surface of tip T is configured to engaged with the user's ear canal so as to form an acoustic seal against and with the user's ear canal. In some examples, tip T is arranged on nozzle 138 of second housing 126 of MC portion 104 (discussed below). Throughout the present disclosure, reference is made to a hearing assistance device 100; however it should be appreciated that the principles discussed herein, i.e., tuning of the air volume within an acoustic housing, acoustic mass, or acoustic stiffness as it relates to a electrodynamic driver, can be implemented in other wearable audio devices, e.g., earbuds, headsets, headphones, sport headphones, audio eyeglass form factor devices, whether they are wired or wireless.

Figure 2:
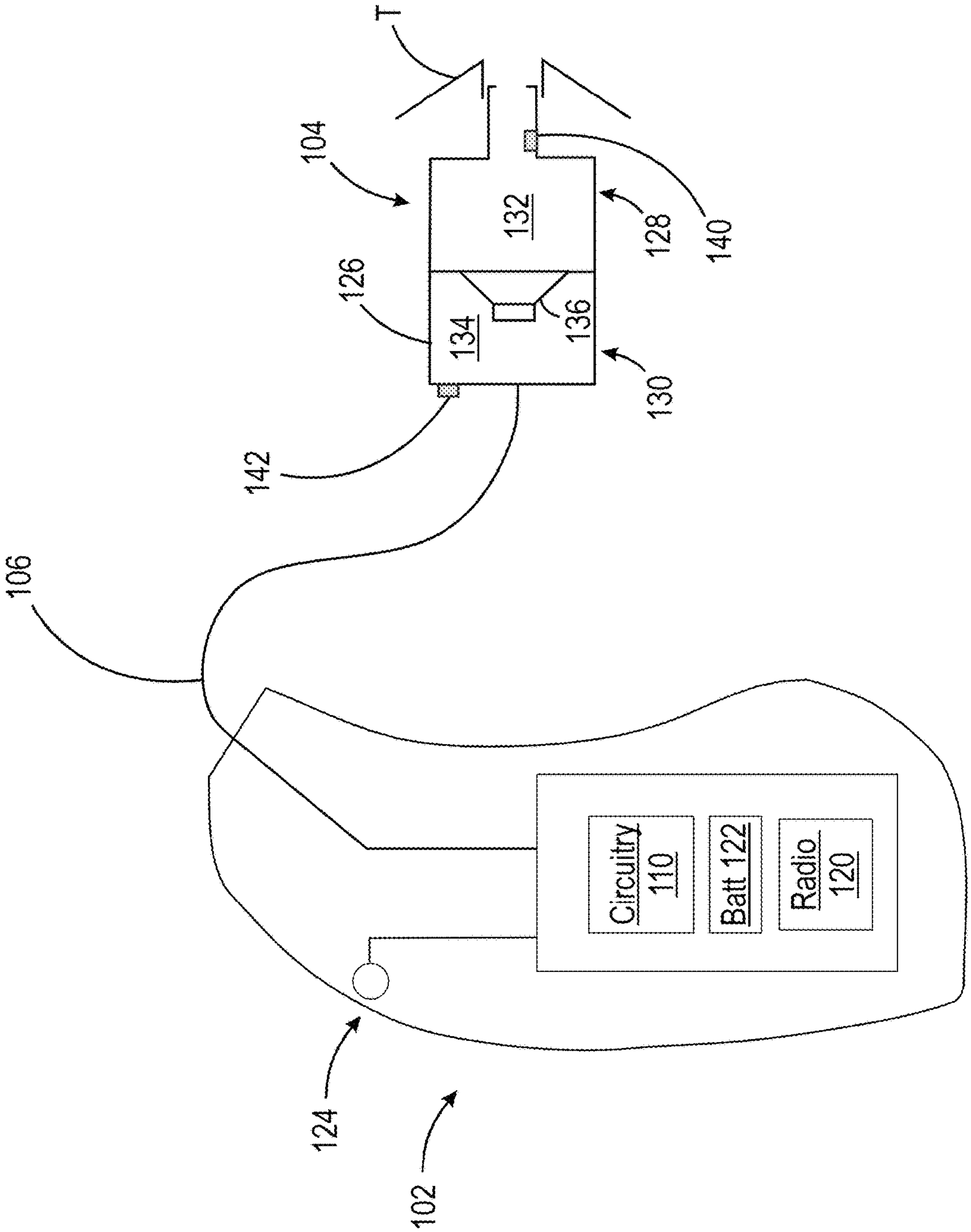
FIG. 2 is a schematic side view of a hearing assistance device according to the present disclosure.
Figure 3:
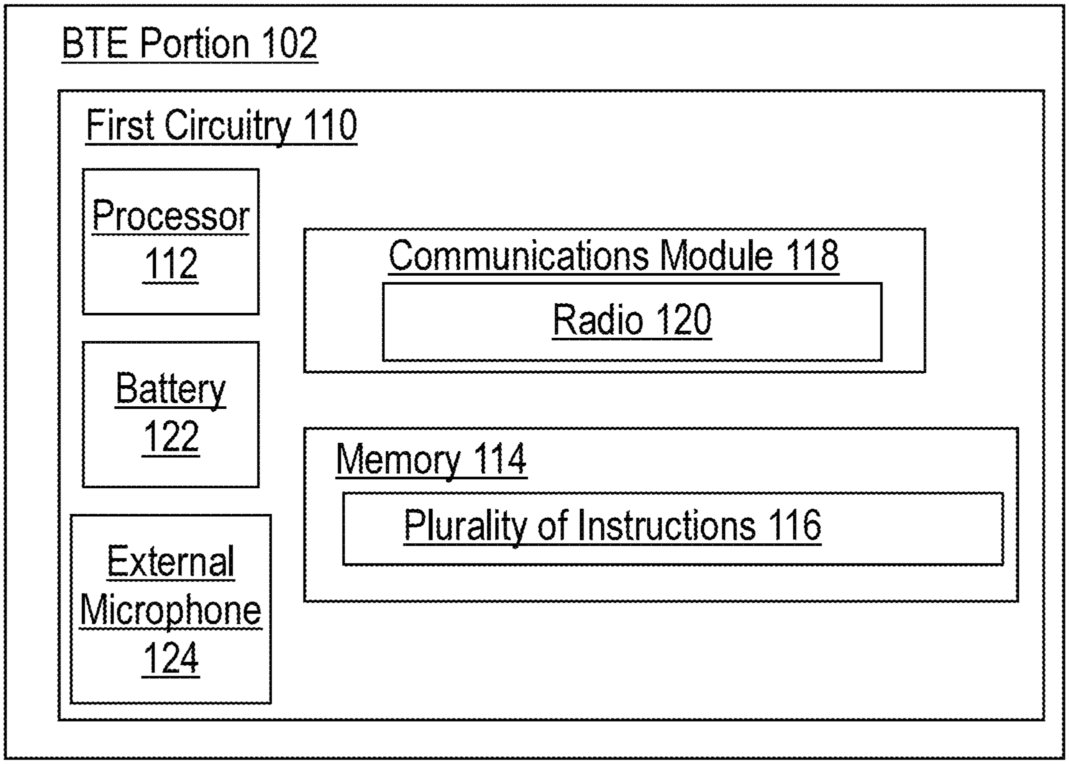
FIG. 3 is a schematic representation of the internal components of a hearing assistance device according to the present disclosure.

FIG. 2 illustrates schematic view of hearing assistance device 100 according to the present disclosure. FIG. 3 illustrates a schematic view of the internal components of BTE portion 102 according to the present disclosure. As illustrated schematically in FIGS. 2 and 3, BTE portion 102 includes a first housing 108 configured to at least partially enclose first circuitry 110. First circuitry 110 includes a processor 112 and a memory 114 configured to execute and store, respectively, a plurality of non-transitory computer-readable instructions 116, to perform the various functions of BTE portion 102 as will be described herein. First circuitry 110 also includes a communications module 118 configured to send and/or receive data, e.g., data used to generate the acoustic energy discussed below. In some examples, communications module 118 is capable of sending and receiving wired or wireless data. To that end, communications module 118 can include at least one radio or antenna, e.g., radio 120, capable of sending and receiving wireless data. In some examples, communications module 118 can include, in addition to at least one radio (e.g., radio 120), some form of automated gain control (AGC), a modulator and/or demodulator, and potentially a discrete processor for bit-processing that are electrically connected to processor 112 and memory 114 to aid in sending and/or receiving wired or wireless data. In some examples, as illustrated in FIGS. 2 and 3, first circuitry 100 also includes a battery 122 or other power source and an external microphone 124. Battery 122 is configured to store electrical energy sufficient to provided power to BTE portion 102 as well as RIC portion 104 via one or more wires 106. Although illustrated and described as a simple battery, it should be appreciated that battery 122 can include any storable power source, e.g., a lithium ion battery, capacitor, or supercapacitor. External microphone 124 is positioned within first housing 108 and configured to receive acoustic energy from outside of first housing 108 of BTE portion 102 coming from the environment surrounding the user. External microphone 124 can also be used in the active noise reduction or active noise cancellation functionality of hearing assistance device 100, as will be discussed below.

FIG. 2 also illustrates a schematic view of RIC portion 104 and the internal components of RIC portion 104. As illustrated, RIC portion 104 includes a second housing 126 configured to at least partially encompass a plurality of components arranged to receive data from BTE portion 102 via one or more wires 106 and generate audible acoustic energy within the user's ear canal. Second housing 126 includes a front portion 128 and a rear portion 130. Front portion 128 is intended to include portions of second housing 126 configured to contact and engage with the user's ear canal during operation of hearing assistance device 100, e.g., tip T of nozzle 138 (discussed below). Front portion 128 also includes a front cavity 132 arranged within second housing 126 and front portion 128 of RIC portion 104. As discussed below, front cavity 132 defines a first acoustic volume 133 (also shown in FIGS. 4-5) and an acoustic passage 139 (also shown in FIGS. 4-5). Additionally, as will be discussed below, first acoustic volume 133 has a first compliance C1. Rear portion 130 is intended to include the internal and external portions of second housing 126 diametrically opposed to front portion 128, and includes a rear cavity 134 arranged within second housing 126 and rear portion 130. As will be described below, rear cavity 134 defines a second acoustic volume 135 (also shown in FIGS. 4-5). As will be described below, second acoustic volume 135 has a second compliance C2 Between front portion 128 and rear portion 130, second housing 126 of RIC portion 104 includes an acoustic driver 136. Acoustic driver 136 is intended to be an electrodynamic driver, e.g., an electrodynamic coil driver. As such, acoustic driver 136 is electrically connected to first circuitry 110 of BTE portion 102 via the one or more wires 106 and is arranged to receive electrical signals from first circuitry 110 and generate audible acoustic energy within second housing 126.

Figure 4:
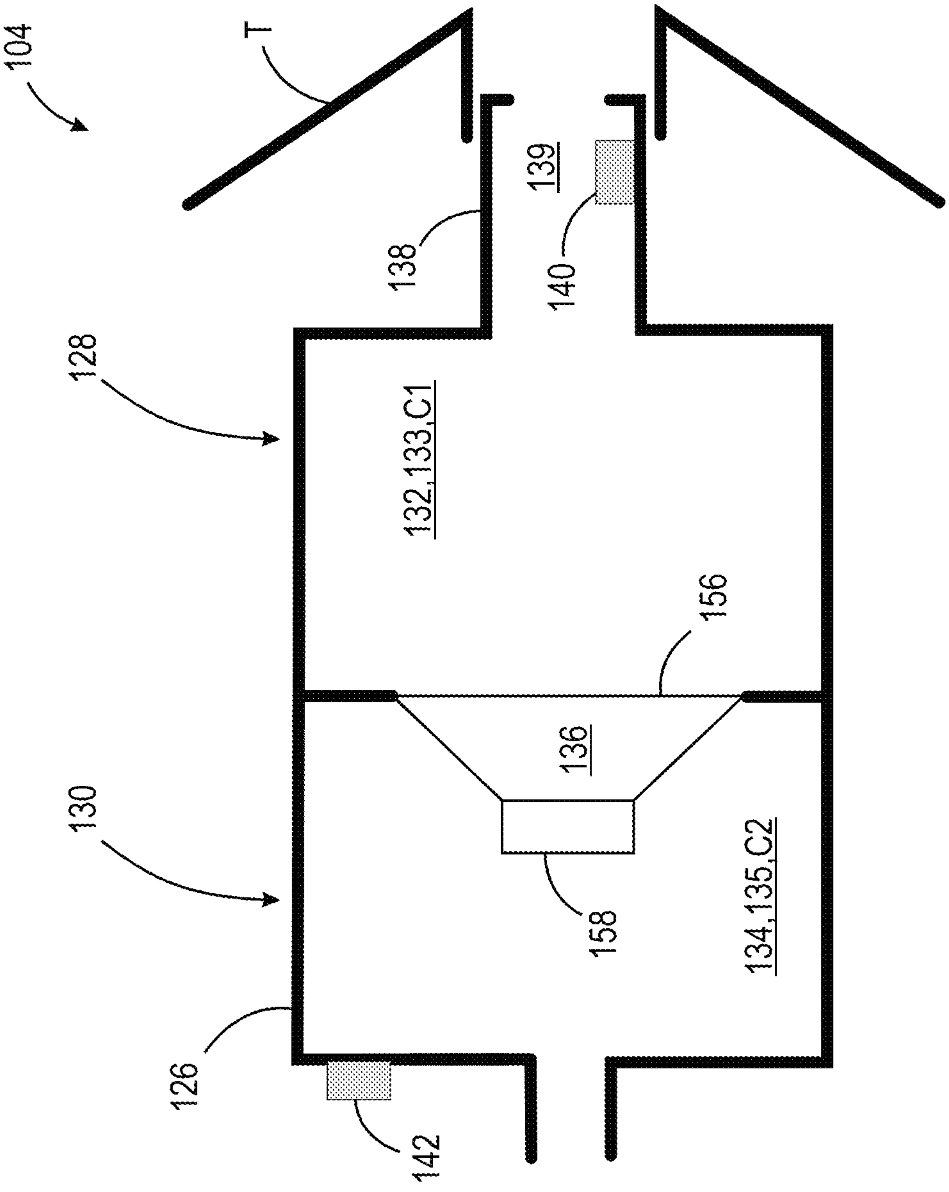
FIG. 4 is a schematic representation of a receiver-in-canal portion of a hearing assistance device according to the present disclosure.

FIG. 4 illustrates a schematic view of RIC portion 104 in isolation for clarity. As shown, RIC portion 104 also includes a nozzle 138, a feedback microphone 140, and a feedforward microphone 142. For example, within the front cavity 132 of front portion 128, second housing 126 of MC portion 104 includes a nozzle 138 integrally formed with the front portion 128 and configured to contour to and engage with the inside surface of a user's ear canal. Nozzle 138 defines an acoustic passage 139 between the first acoustic volume 133 and the user's ear canal (not shown). Additionally, feedback microphone 140 is positioned within nozzle 138 and/or front cavity 132 of front portion 128, while feedforward microphone 142 is positioned outside of second housing 126. In some non-limiting examples feed forward microphone 142 is positioned on the rear portion 130. Accordingly, feedback microphone 140 and feedforward microphone 142 are communicably coupled to first circuitry 110 of BTE portion 102 via the one or more wires 106, and are configured to obtain acoustic signals representative of the acoustic energy produced within the user's ear canal and the environment outside the user's ear, respectively. Using the signals obtained from these microphones, hearing assistance device 100 can utilize one or more active noise reduction (ANR) or active noise cancellation (ANC) algorithms to filter one or more unwanted frequencies outside of or inside of the user's ear canal using acoustic driver 136.

As set forth above, in some examples, acoustic driver 136 is an electrodynamic coil driver. Although generally inexpensive, electrodynamic coil drivers are typically inefficient at amplifying acoustic signals at the upper end of the range of frequencies associated with human speech, e.g., the upper end of the voice band. For example, the majority of the frequencies related to human speech, i.e., the voice band, can include frequencies between 100 Hz and 8 kHz. In some examples, the frequencies related to human speech include frequencies between 100 Hz and 6 kHz. When a user loses their hearing, they typically start to lose sensitivity to frequencies at the upper end of that range, e.g., above 1 kHz, or more specifically between 2.5 kHz and 8 kHz and in some examples between 2.5 kHz and 6 kHz. Moving coil drivers, such as acoustic driver 136, typically require excessive energy to amplify acoustic signals within the 2.5 kHz to 8 kHz range or within the 2.5 kHz to 6 kHz range. The present disclosure is intended to utilize tunable resonant properties of the acoustic driver 136 and/or the second housing 126 to aid the acoustic driver 136 in generating amplified acoustic energy within certain frequency ranges. By tuning the acoustic driver 136 and/or the second housing 126 to resonate at certain frequencies within that range, the electrodynamic driver can use the resonance generated to increase the hearing assistance device's efficiency. In other words, the hearing assistance device 100 becomes more efficient at amplifying sound within the range of 2.5 kHz and to 6 kHz. To tune the resonance frequency of the acoustic driver 136 and/or the second housing 126, the acoustic driver 136 and/or the second housing 126 can include one or more acoustic ports 144 that operate to change the volume or acoustic stiffness of air within the acoustic driver 136 and/or within second housing 126.

Figure 5:
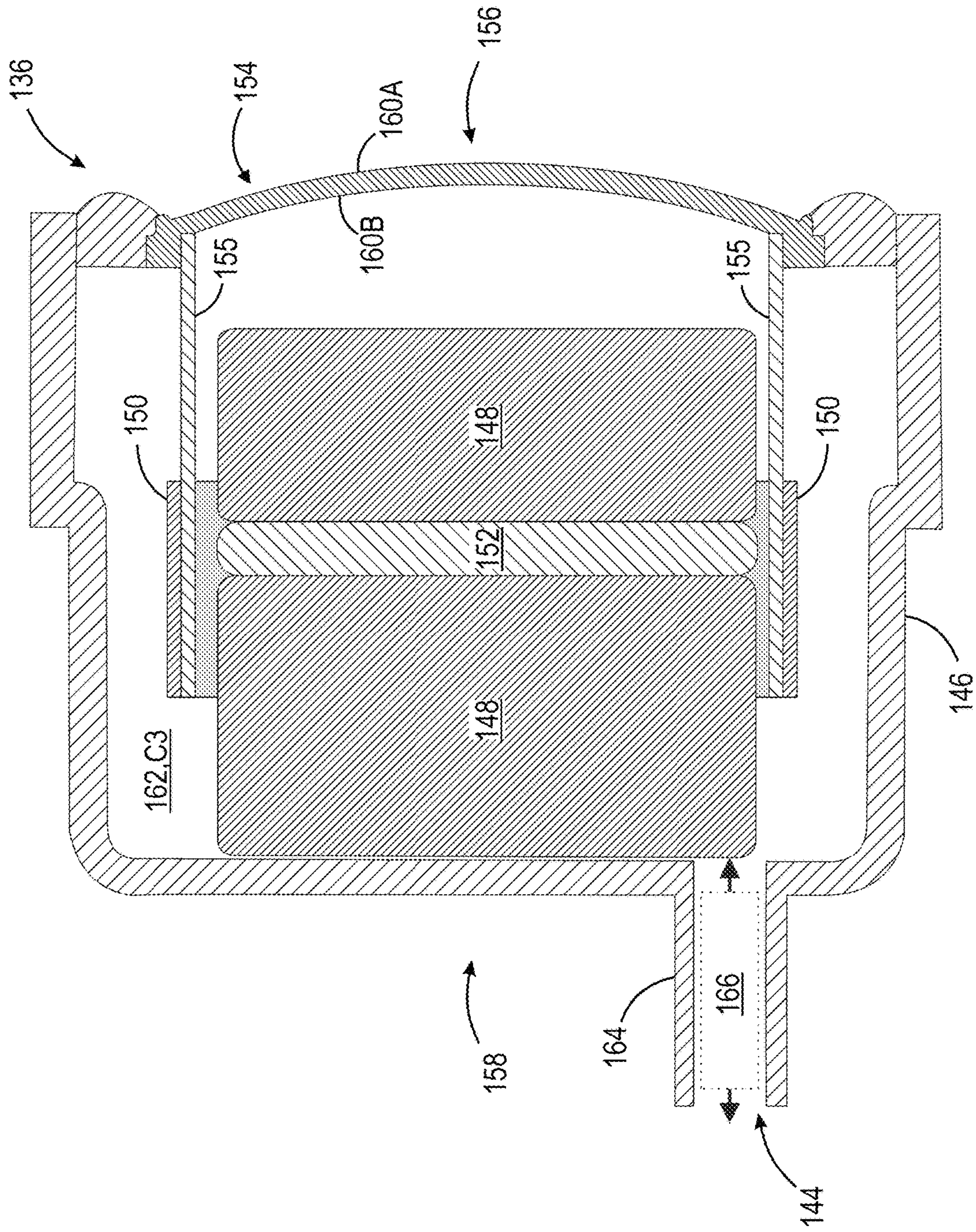
FIG. 5 is a cross-sectional view of an acoustic driver of a hearing assistance device according to the present disclosure.

FIG. 5 illustrates a schematic cross-sectional view of an example acoustic driver 136 according to the present disclosure. As shown, acoustic driver 136 includes a driver housing 146, one or more magnets 148, a coil 150, and a plate 152 that, in response to electrical signals from BTE portion 102, move diaphragm 154 (mechanically coupled to the coil 150 via a bobbin 155) to generate audible acoustic energy. Additionally, as shown, acoustic driver 136 has a front side 156 and a rear side 158. While front side 156 includes diaphragm 154, rear side 158 includes an acoustic port 144. Although FIG. 5 illustrates a single acoustic port 144, it should be appreciated that acoustic driver 136 can include additional ports 144 (not shown) where one or more of those additional ports 144 can be blocked by an acoustically blocking material. For example, acoustic driver 136 could include two, three, four, five, or more acoustic ports 144 where all but one port is blocked by a material that reduces or eliminates that ability for acoustic energy generated within the acoustic driver 136 to exit driver housing 146. Furthermore, as shown in FIG. 5, diaphragm 154 includes a first radiating surface 160A and a second radiating surface 160B. First radiating surface 160A defines the side of diaphragm 154 that faces and is acoustically coupled to first cavity 132 and first acoustic volume 133. Second radiating surface 160B defines the surface of the diaphragm 154 that is diametrically opposed to first radiating surface 160A and faces the internal volume 162 of acoustic driver 136. Internal volume 162 refers to the volume of air contained within acoustic driver 136 during operation and internal volume 162 has a third compliance C3. Additionally, it should be noted that other structures used in the operation of acoustic driver 136 have been omitted from the figures for clarity, e.g., adhesive elements that secure the bobbin 155 to diaphragm 154.

As used herein, and in addition to its ordinary meaning to those of skill in the art, the term "acoustic mass" is used to describe a volumetric portion of air positioned within a portion of second housing 126 and/or within elongated portion 164 of acoustic driver 136 that may oscillate in response to changes in acoustic energy.

Additionally, as discussed above, first acoustic volume 133, second acoustic volume 135 and the internal volume 162 of the second housing 126 and driver housing 146 have a respective compliance, i.e., first compliance C1, second compliance C2, and third compliance C3, respectively. As used herein, and in addition to its meaning to those skilled in the art, the term "compliance" is intended to refer to the acoustic property of a volume of air to exhibit a spring-like property on an associated mass, e.g., an acoustic mass. The resonance properties described below utilize both a mass, e.g., an acoustic mass 166, and a spring, e.g., the compliance of a given volume of air, to generate resonance within the structures provided. Thus, "compliance," as used herein is intended to describe the ability for a confined volume of air to exhibit spring-like influence over acoustic masses within the hearing assistance device 100.

Referring back to FIG. 5, FIG. 5 illustrates one schematic example of a cross-sectional profile of acoustic driver 136 (hereinafter referred to as the "back-resonance example"). In the back-resonance example, acoustic driver 136 has been configured or tuned to resonate at one or more resonance frequencies between 2.5 kHz and 8 kHz, e.g., between 2.5 kHz and 6 kHz or between 3.5 kHz and 4.5 kHz. As shown in FIG. 5, a single acoustic port 144 is provided, such that only a single acoustic port 144 is open to rear cavity 134 of second housing 126. As shown, acoustic port 144 can include an elongated portion 164 configured to alter the interaction between the internal volume 162 of driver housing 142 and diaphragm 154 to define a resonance frequency of the acoustic driver 136. In the example shown, the single acoustic port 144 includes an elongated portion 164 having a length, width, and/or shape that is tunable or changeable to alter the volume of air within the elongated portion, i.e., acoustic mass 166. As resonance requires both a mass and a spring, in the back-resonance example, the mass of the diaphragm 154 acts as the mass while the compliance C3 of air within the driver housing 146 operates as the spring.

During operation, the acoustic mass 166 is configured to oscillate, e.g., move into and out of the opening of acoustic port 144 (shown with a black doubled-sided arrow in FIG. 5). It should be appreciated that, at low frequencies, e.g., at frequencies less than or equal to 1 kHz, acoustic mass 166 is formed within elongated portion 164 such that acoustic mass 166 oscillates freely into and out of port 144, i.e., with low impedance. In other words, at low frequencies acoustic port 144 appears acoustically open. However, at or within a frequency range of interest, e.g., at or within a range of frequencies within the voiceband of human speech (discussed above), the acoustic mass 166 will have high impedance and will resist oscillation into and out of port 144. This heightened impedance at high frequencies, e.g., at frequencies greater than 1 kHz, between 2.5 kHz and 8 kHz, or between 2.5 kHz and 6 kHz, causes the acoustic port 144 to appear closed or sealed to acoustic energy, i.e., is acoustically closed. By "acoustically closing" the only port, i.e., acoustic port 144, the mass of the diaphragm 154 and the compliance C3 of the internal volume 162 of the driver housing 146 will resonate at frequencies at or within these key ranges of interest. Thus, as the internal volume 162 of the driver housing 146 remains the same, by changing, tuning, or otherwise adjusting the shape of the elongated portion 164, the acoustic mass 166 is changed, tuned, or otherwise adjusted. Therefore, changing the acoustic mass 166 changes the frequencies that the acoustic mass 166 will have high impedance and thus resist or impede transfer of acoustic energy from within the driver housing 146. In other words, the elongated portion 164 is configured to define an acoustic mass 166 that will have high impedance, at or within certain frequencies ranges, that causes a resonance between the diaphragm 154 and the internal volume 162 of the driver housing 146 at those frequencies. Thus, the present disclosure provides a tunable acoustic mass 166 created by the length, width, and shape of elongated portion 164 that assists the electrodynamic acoustic driver 136 in producing acoustic energy in frequency ranges above 1 kHz, while not interfering with the generation of acoustic energy in frequency ranges equal to or below 1 kHz.

Figure 6:
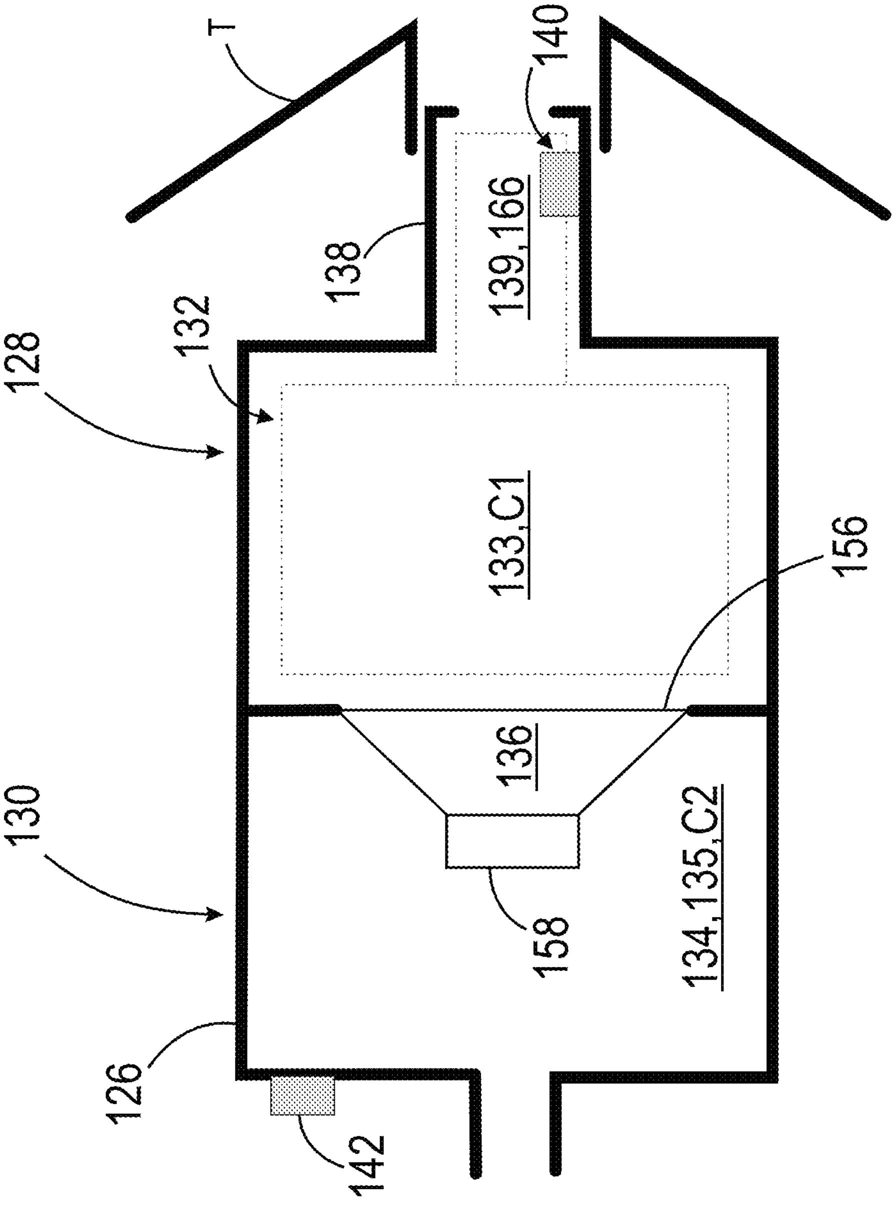
FIG. 6 is schematic representation of a receiver-in-canal portion of a hearing assistance device according to the present disclosure.

FIG. 6 illustrates another example configuration of hearing assistance device 100 (hereinafter referred to as the "front-resonance example"). In the front-resonance example, an acoustic mass 166 is formed by the volume of air within nozzle 138. To form a resonance in the front-resonance example, a compliance C1 of the volume of air within first cavity 132, i.e., first acoustic volume 133, acts as a spring, while the acoustic mass 166 formed within the nozzle 138, or more specifically, within the acoustic passage 139 within nozzle 138, acts as the mass. In this example configuration, the acoustic mass 166 is configured to oscillate as described above, i.e., into and out of the opening at the end of nozzle 138, in response to acoustic energy generated by acoustic driver 136. Similarly to the back-resonance example, the interior volume of the nozzle 138, i.e., the acoustic passage 139 has a length, width, and shape that is tunable or configurable to create a desired acoustic mass. For example, as shown, the length, width, and/or shape of acoustic passage 139 can be altered such that at low frequencies, e.g., at frequencies less than or equal to 1 kHz, the acoustic mass 166 formed within acoustic passage 139 can freely move and/or oscillate into and out of the opening at the end of nozzle 138. However, at high frequencies, e.g., at frequencies greater than 1 kHz, between 2.5 kHz and 8 kHz, or between 2.5 kHz and 6 kHz, acoustic mass 166 and the compliance C1 of the air within first acoustic volume 133 are configured to resonate and aid the electrodynamic acoustic driver 136 in generating acoustic energy with those frequency ranges. In other words, the mass of the air within acoustic passage 139, i.e., acoustic mass 166, and the compliance of the air within the first acoustic volume 133 of the first cavity 132, together form a Helmholtz resonator such that air in the acoustic passage 139 resonates with air in the first acoustic volume 133 in the high frequency ranges described above, thereby increasing the acoustic output into the user's ear canal in those frequency ranges.

It should be appreciated that the techniques for tuning the resonance properties of the acoustic passage 139, and/or the acoustic driver 136, can be combined in any conceivable combination that would allow for a specific resonance frequency or frequencies within the ranges of human speech discussed above, e.g., at least the range of 2.5 kHz to 6 kHz. For example, hearing assistance device 100 can employ the structural configurations set forth in both the back-resonance example and the front-resonance example. Specifically, hearing assistance device 100 can include a driver housing 146 with a single acoustic port 144 formed with an acoustic mass 166 and configured to have high impedance at high frequencies, and also include a separate acoustic mass 166 formed within the acoustic passage 139 of nozzle 138, where both acoustic masses are configured or tuned to boost the efficiency of the electrodynamic acoustic driver 136 in the creation of acoustic energy within the voiceband of human speech through the resonances described above.

Figure 7:
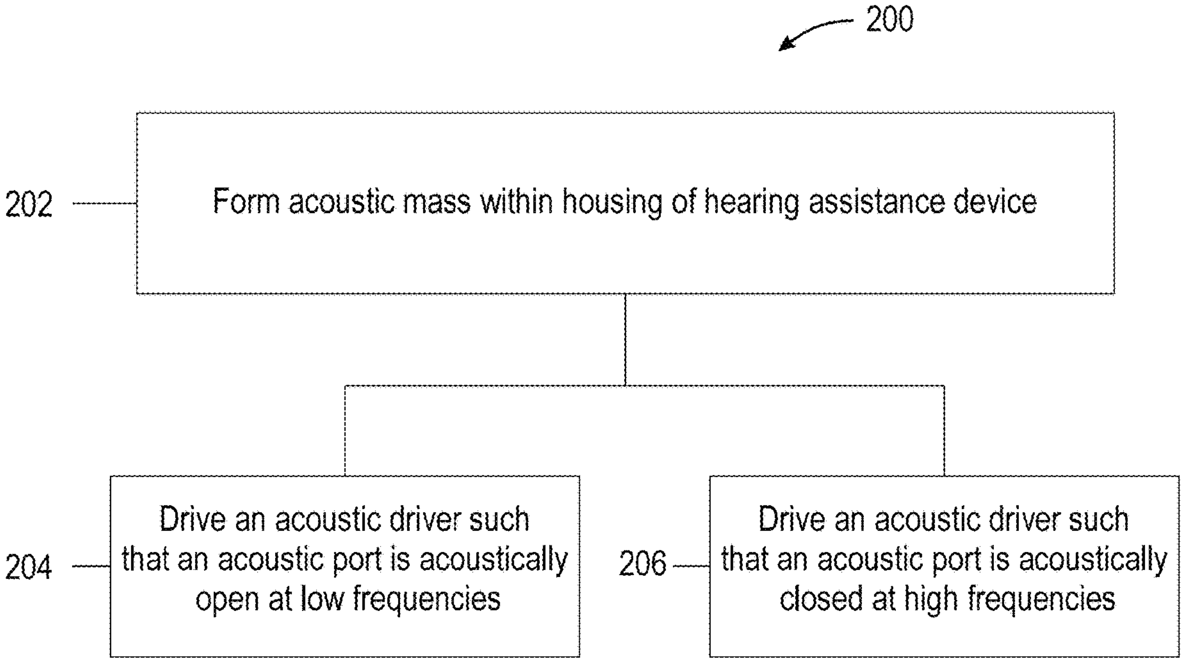
FIG. 7 is a flow chart illustrating exemplary steps of a method according to the present disclosure.

FIG. 7 illustrates a flow chart of an exemplary set of a method of generating a resonance within a hearing assistance device according to the present disclosure, i.e., method 200. Method 200 includes, for example: forming an acoustic port 144 on or in a driver housing 146 of an acoustic driver 136, the acoustic driver 136 disposed within the hearing assistance device 100 and comprising a diaphragm 154 (step 202); and driving the acoustic driver 136 such that: i) at low frequencies the acoustic port 144 is acoustically open (step 204); and ii) at high frequencies the acoustic port 144 is acoustically sealed such that a compliance C3 of a volume air within the driver housing 146 resonates with a mass of the diaphragm 154 at the high frequencies (step 206).

Figure 8:
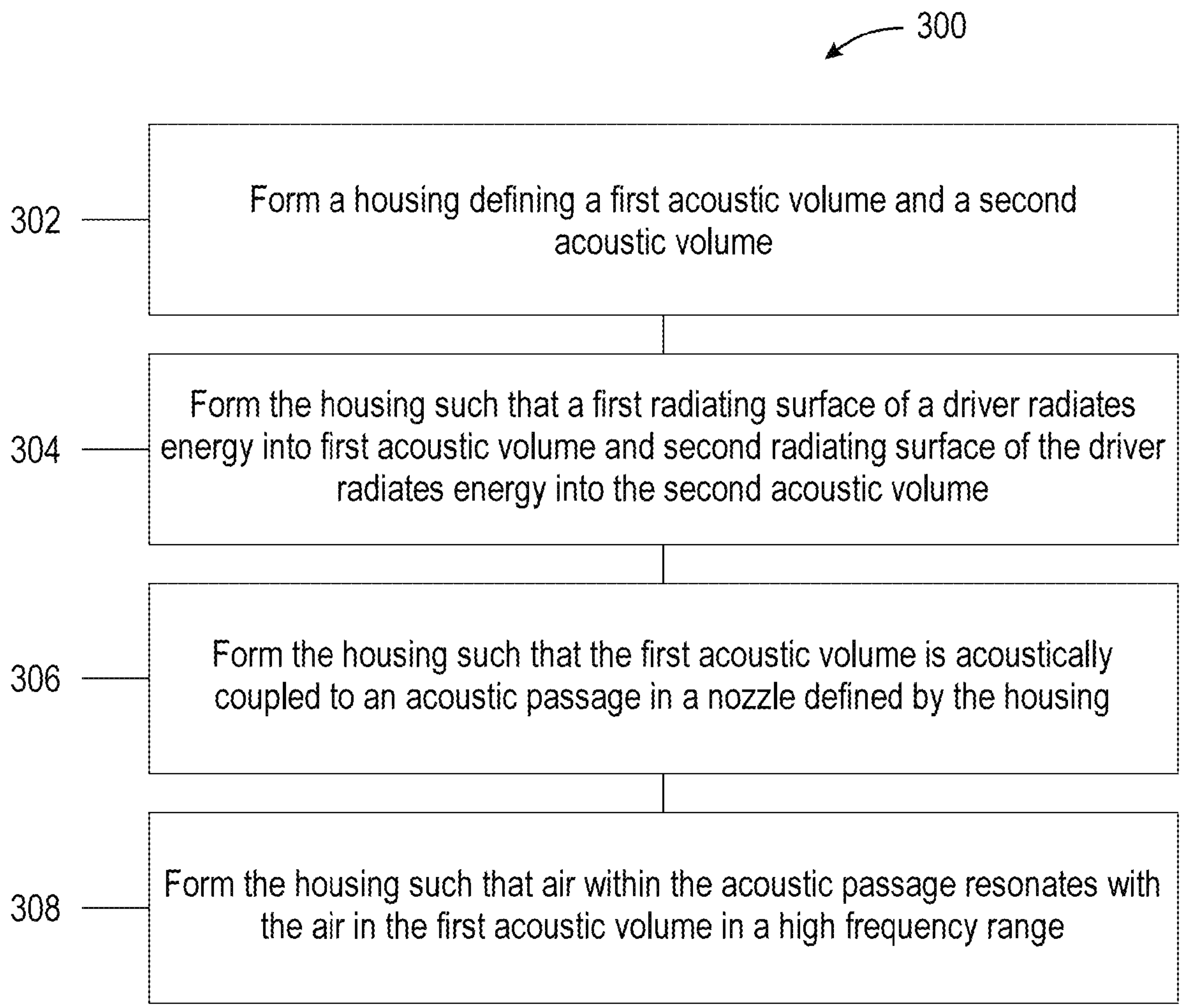
FIG. 8 is a flow chart illustrating exemplary steps of a method according to the present disclosure.

FIG. 8 illustrates a flow chart of an exemplary set of a method of generating a resonance within a hearing assistance device according to the present disclosure, i.e., method 300. Method 300 includes, for example: forming a housing 126 to support an acoustic driver 136 such that the housing 126 and the acoustic driver 136 together define a first acoustic volume 133 and a second acoustic volume, e.g., internal volume 162 (step 302); forming the acoustic driver 136 such that a first radiating surface 160A of a diaphragm 154 of acoustic driver 136 radiates acoustic energy into the first acoustic volume 133 and such that a second radiating surface 160B of the diaphragm 154 of the acoustic driver 136 radiates acoustic energy into a second acoustic volume 162 (step 304); forming the housing 126 such that housing 126 defines a nozzle 138 and wherein the first acoustic volume 133 is acoustically coupled to an acoustic passage 139 in the nozzle 139 such that the acoustic driver 136 is acoustically coupled to a user's ear canal when the hearing assistance device is worn (step 306); and forming the housing 126 such that housing 126 is configured such that air in the acoustic passage 139 resonates with air in the first acoustic volume 133 in a high frequency range, thereby increasing acoustic output into the user's ear canal in the high frequency range (step 308).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A hearing assistance device comprising:

a housing having a front portion and a rear portion, the front portion arranged to be acoustically coupled to a user's ear canal;

an acoustic driver disposed within the housing, the acoustic driver comprising a driver housing, a diaphragm, and an internal volume; and an acoustic port provided in the driver housing, open to the rear portion of the housing and the internal volume of the acoustic driver, and configured such that:

i.) at low frequencies the acoustic port is acoustically open to the internal volume of the acoustic driver; and ii.) at high frequencies the acoustic port is acoustically sealed such that a compliance of air within the driver housing resonates with a mass of the diaphragm at the high frequencies, wherein the acoustic driver includes a front side configured to face the front portion of the housing and a rear side configured to face the rear portion of the housing, wherein the acoustic port is disposed on and through the rear side of the acoustic driver, and wherein the acoustic port includes an elongated portion configured to protrude from the rear side of the acoustic driver toward the rear portion of the housing and wherein an acoustic mass is formed within the elongated portion.

2. The hearing assistance device of claim 1, wherein the acoustic driver is an electrodynamic driver.

3. The hearing assistance device of claim 1, wherein low frequencies include frequencies less than or equal to 1 kHz.

4. The hearing assistance device of claim 1, wherein high frequencies includes frequencies greater than 1 kHz and less than or equal to 8 KHz.

5. The hearing assistance device of claim 1, wherein high frequencies are frequencies within a voice band of human speech greater than or equal to 2.5 kHz and less than or equal to 6 kHz.

6. The hearing assistance device of claim 1 further comprising: a feedback microphone electrically coupled to at least the acoustic driver such that the hearing assistance device provides active noise cancellation or active noise reduction.

7. A hearing assistance device comprising:

an acoustic driver; and a housing supporting the acoustic driver such that the housing and the acoustic driver together define a first acoustic volume and a second acoustic volume, the acoustic driver being arranged such that a first radiating surface of the acoustic driver radiates acoustic energy into the first acoustic volume of the housing and such that a second radiating surface of the driver radiates acoustic energy into the second acoustic volume, wherein the housing defines a nozzle, and wherein the first acoustic volume is acoustically coupled to an acoustic passage in the nozzle such that the acoustic driver is acoustically coupled to a user's ear canal when the hearing assistance device is worn, and wherein the acoustic passage has a configurable or tunable length, width, and/or shape to create an acoustic mass within the acoustic passage such that, in response to acoustic energy generated by the acoustic driver, the acoustic mass in the acoustic passage resonates with air in the first acoustic volume in a high frequency range, thereby increasing acoustic output into the user's ear canal in the high frequency range.

8. The hearing assistance device of claim 7, wherein the acoustic driver is an electrodynamic driver.

9. The hearing assistance device of claim 7, wherein the high frequency range includes frequencies greater than or equal to 1 kHz.

10. The hearing assistance device of claim 7, wherein the high frequency range includes frequencies greater than or equal to 2.5 kHz and less than or equal to 8 kHz.

11. The hearing assistance device of claim 7, wherein the high frequency range includes frequencies within a voice band of human speech greater than or equal to 2.5 kHz and less than or equal to 6 kHz.

12. The hearing assistance device of claim 7, wherein the first acoustic volume comprises a volume of air having a compliance and wherein the acoustic passage of the nozzle comprises an acoustic mass such that the acoustic mass of the acoustic passage and the compliance of the volume of air within the first acoustic volume resonate at frequencies within the high frequency range.

13. A method of generating a resonance within a hearing assistance device, the method comprising:

forming an acoustic port on or in a driver housing of an acoustic driver, the acoustic port open to a rear portion of a housing enclosing the driver housing and an internal volume of the acoustic driver, the acoustic driver disposed within the hearing assistance device and comprising a diaphragm;

driving the acoustic driver such that:

i.) at low frequencies the acoustic port is acoustically open to the internal volume of the acoustic driver; and ii.) at high frequencies the acoustic port is acoustically sealed such that a compliance of a volume of air within the driver housing resonates with a mass of the diaphragm at the high frequencies, wherein the acoustic driver includes a front side configured to face the front portion of the housing and a rear side configured to face the rear portion of the housing, wherein the acoustic port is disposed on and through the rear side of the acoustic driver, and wherein the acoustic port includes an elongated portion configured to protrude from the rear side of the acoustic driver toward the rear portion of the housing and wherein an acoustic mass is formed within the elongated portion.

14. The method of claim 13, wherein the acoustic driver is an electrodynamic driver.

15. The method of claim 13, wherein the acoustic driver is formed with a front side configured to face a first cavity of the housing and a rear side configured to face a second cavity of the housing, wherein the acoustic port is disposed on and through the rear side of the acoustic driver.

16. The method of claim 15, wherein the acoustic port is formed with an elongated portion configured to protrude from the rear side of the acoustic driver toward the second cavity of the housing and wherein an acoustic mass is formed within the elongated portion.

17. The method of claim 13, wherein high frequencies includes frequencies greater than 1 kHz and less than or equal to 8 kHz.

18. The method of claim 13, wherein high frequencies are frequencies within a voice band of human speech greater than or equal to 2.5 kHz and less than or equal to 6 kHz.

19. A hearing assistance device comprising:

a housing having a front portion and a rear portion, the front portion arranged to be acoustically coupled to a user's ear canal;

an acoustic driver disposed within the housing, the acoustic driver comprising a driver housing and a diaphragm; and an acoustic port of configurable or tunable length, width, and/or shape, wherein the acoustic port is provided in the driver housing and configured such that:

i.) at low frequencies the acoustic port is acoustically open; and ii.) at high frequencies the acoustic port is acoustically sealed such that a compliance of air within the driver housing resonates with a mass of the diaphragm at the high frequencies to assist with the generation of acoustic energy at the high frequencies, wherein the acoustic port is acoustically open at low frequencies and simultaneously acoustically closed at high frequencies.

* * * * *